United States Patent
Kakinuki

(10) Patent No.: US 11,130,633 B2
(45) Date of Patent: Sep. 28, 2021

(54) AUTOMATED WAREHOUSE SYSTEM

(71) Applicant: Murata Machinery, Ltd., Kyoto (JP)

(72) Inventor: Tsuyoshi Kakinuki, Inuyama (JP)

(73) Assignee: Murata Machinery, Ltd., Kyoto (JP)

( * ) Notice: Subject to any disclaimer, the term of this patent is extended or adjusted under 35 U.S.C. 154(b) by 198 days.

(21) Appl. No.: 16/532,634

(22) Filed: Aug. 6, 2019

(65) Prior Publication Data

US 2020/0062506 A1   Feb. 27, 2020

(30) Foreign Application Priority Data

Aug. 22, 2018   (JP) .............................. JP2018-155122

(51) Int. Cl.
 *B65G 1/137*   (2006.01)

(52) U.S. Cl.
 CPC .................................. *B65G 1/1376* (2013.01)

(58) Field of Classification Search
 CPC .... B65G 1/1376; B65G 1/0492; B65G 1/045; B65G 1/133; B65G 1/0414
 See application file for complete search history.

(56) References Cited

U.S. PATENT DOCUMENTS

| | | | | |
|---|---|---|---|---|
| 6,652,213 B1* | 11/2003 | Mitchell | .............. | B65G 1/0492 414/279 |
| 8,974,168 B2* | 3/2015 | Yamashita | ............. | B65G 1/065 414/279 |
| 2008/0181753 A1* | 7/2008 | Bastian | ................ | B65G 1/1375 414/277 |
| 2011/0262253 A1* | 10/2011 | Krizmanic | .............. | B60L 53/20 414/279 |
| 2012/0009047 A1* | 1/2012 | Ogawa | ................... | B65G 1/065 414/267 |
| 2012/0195720 A1* | 8/2012 | Sullivan | ............... | B65G 1/0492 414/277 |
| 2013/0103248 A1 | 4/2013 | Ogawa | | |
| 2017/0282217 A1* | 10/2017 | Abedalsada Mahdi | ...................... | B65G 1/0478 |

FOREIGN PATENT DOCUMENTS

| | | |
|---|---|---|
| JP | 2010-58904 A | 3/2010 |
| WO | 2011/161979 A1 | 12/2011 |

* cited by examiner

*Primary Examiner* — Timothy R Waggoner
(74) *Attorney, Agent, or Firm* — DLA Piper LLP (US)

(57) ABSTRACT

An automated warehouse system includes a revolving transport device configured to revolve a holding table to transport the article, a plurality of racks arranged across a forward path and a return path extending from a reference point to a turning point of the revolving transport device, a transport vehicle disposed adjacent to a side of each of the racks and configured to transport the article across the forward path and the return path of the revolving transport device, the transport vehicle including a transferring and placing device configured to transfer and place the article with respect to the rack, a lift transport device configured to lift and lower the article to a position corresponding to each level of each of the racks, and a transfer device configured to transfer the article between the revolving transport device and the lift transport device.

5 Claims, 5 Drawing Sheets

AUTOMATED WAREHOUSE SYSTEM

TECHNICAL FIELD

This disclosure relates to an automated warehouse system capable of individually putting and retrieving desired articles into and from a plurality of racks with high efficiency.

BACKGROUND

For a conventional automated warehouse system that stores a large number of articles and automatically puts and retrieves the articles, it is desirable that the large number of articles be put and retrieved with high efficiency.

For example, WO 2011/161979 A discloses an automated warehouse capable of collectively putting a large number of articles into a rack by repeatedly performing a procedure of lifting articles arranged in a row by one level of the rack, arranging new articles under the articles thus lifted, and simultaneously lifting the articles arranged one above the other by one level of the rack. The automated warehouse is further capable of collectively retrieving articles from the rack by performing the above-described procedure in reverse order.

Although an automated warehouse such as the automated warehouse disclosed in WO 2011/161979 A is capable of collectively putting a large number of articles into the automated warehouse and collectively retrieving a large number of articles from the automated warehouse, it is difficult for such an automated warehouse to individually put and retrieve desired articles and repeatedly put and retrieve a large number of articles at high speed. Further, it is difficult for such a conventional automated warehouse to deliver articles stored in any one of a plurality of racks to a desired place.

It could therefore be helpful to provide an automated warehouse system capable of individually putting and retrieving a large number of articles with high efficiently.

SUMMARY

We Thus Provide:

An automated warehouse system configured to automatically put and retrieve an article includes a revolving transport device configured to revolve a holding table holding the article to transport the article, a plurality of racks arranged across at least one of a forward path and a return path, the forward path extending from a reference point to a turning point of the revolving transport device, the return path extending from the turning point to the reference point, a transport vehicle disposed adjacent to a side of each of the racks and configured to transport the article along the rack, the transport vehicle including a transferring and placing device configured to transfer and place the article with respect to the rack, a lift transport device configured to lift and lower the article to a position corresponding to each level of each of the racks; a transfer device configured to transfer the article between the revolving transport device and the lift transport device, a loading device configured to load the article to the revolving transport device, and an unloading device configured to unload the article from the revolving transport device.

This makes it possible to store a large number of articles in a compact manner, and put and retrieve a large number of articles individually with high efficiently.

Further, the loading device may be disposed at both an upstream end of the forward path and an upstream end of the return path of the revolving transport device, and the unloading device may be disposed at both a downstream end of the forward path and a downstream end of the return path of the revolving transport device.

The automated warehouse system may further include a control device configured to control loading and unloading of the article to and from the revolving transport device to prevent the article from passing through the reference point and the turning point.

This makes it possible to prevent the article from passing through the reference point and the turning point, and thus makes it possible to cause the holding table to sharply turn and increase the transport efficiency of the revolving transport device. Accordingly, it is possible to increase the putting and retrieving efficiency of the automated warehouse system.

Further, the lift transport device may be disposed at an end of each of the racks. This allows for an arrangement that prevents the lift transport device and the transport vehicle from coming into contact with each other, and thus makes it possible to employ a relatively large lift transport device.

The automated warehouse system may further include a storage configured to store the article to be supplied to the loading device and the article unloaded from the unloading device, and a transport transferring and placing device that is capable of transferring and placing the article with respect to the storage and is lower in transport efficiency than the transport vehicle. This causes articles to be sorted and then stored, that is, articles that need to be frequently put and retrieved to be stored in the rack, and articles that need not be frequently put and retrieved to be stored in the storage, and causes the transport transferring and placing device to load and unload the articles, which in turn makes it possible to increase the transport efficiency of the automated warehouse system as a whole.

It is possible to provide the automated warehouse system capable of individually putting and retrieving a large number of articles with high efficiently.

DETAILED DESCRIPTION

Next, a description will be given of an example of an automated warehouse system with reference to the drawings. Note that the example to be described below corresponds to an inclusive or specific example. Numerical values, shapes, materials, constituent elements, placement positions and connection modes of the constituent elements, steps, order of the steps, and the like described in the following example are merely exemplary and are not intended to limit this disclosure or the subject matter herein.

Among the constituent elements in the following example, constituent elements not set forth in the independent claim indicating the top level concept will be described as optional constituent elements.

Further, the drawings are schematic drawings in which emphasis, omission, and adjustment of ratios are appropriately made to represent my systems, and may differ in shape, positional relation, and ratio from actual shapes, positional relations, and ratios.

Figure 1:
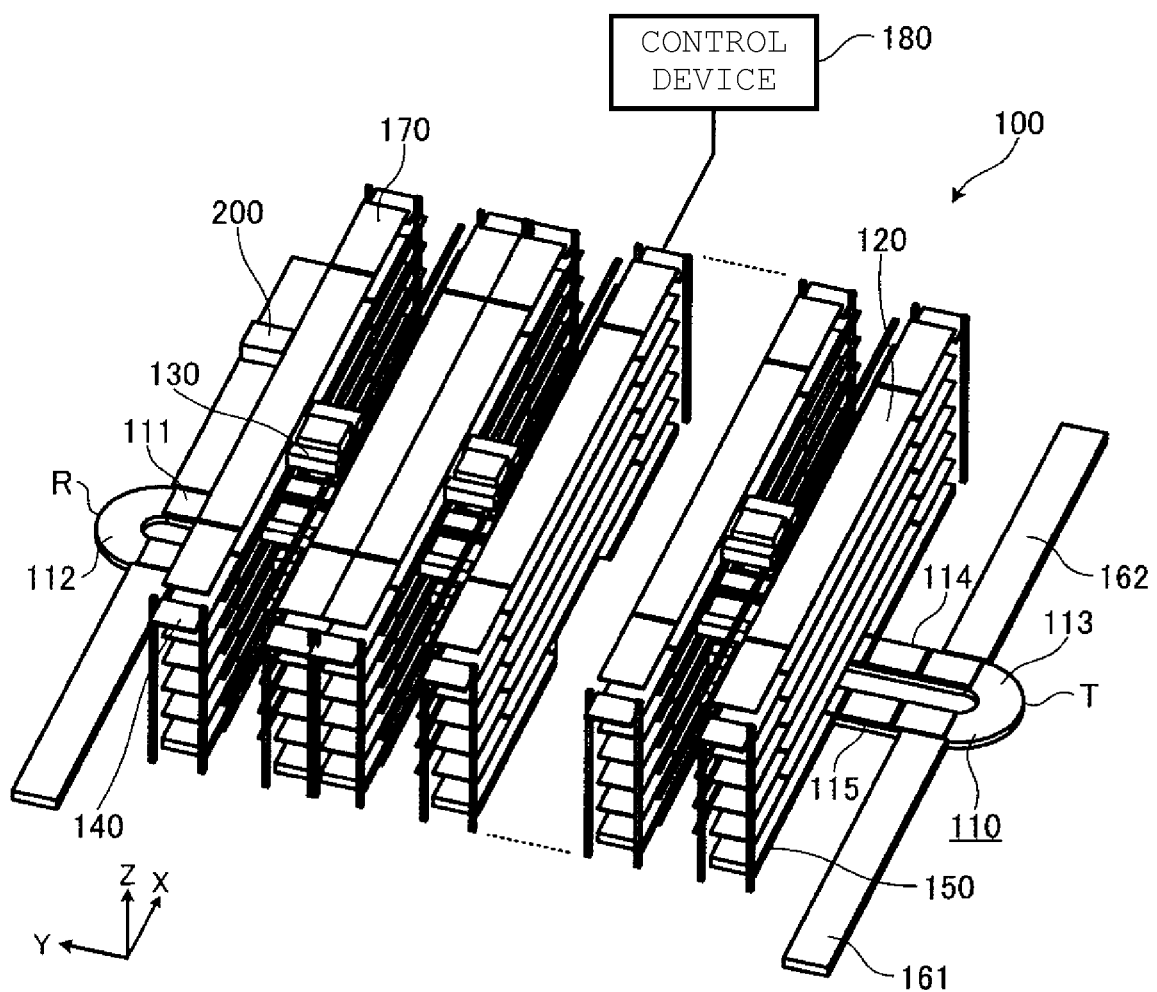
FIG. 1 is a perspective view illustrating an automated warehouse system.
Figure 2:
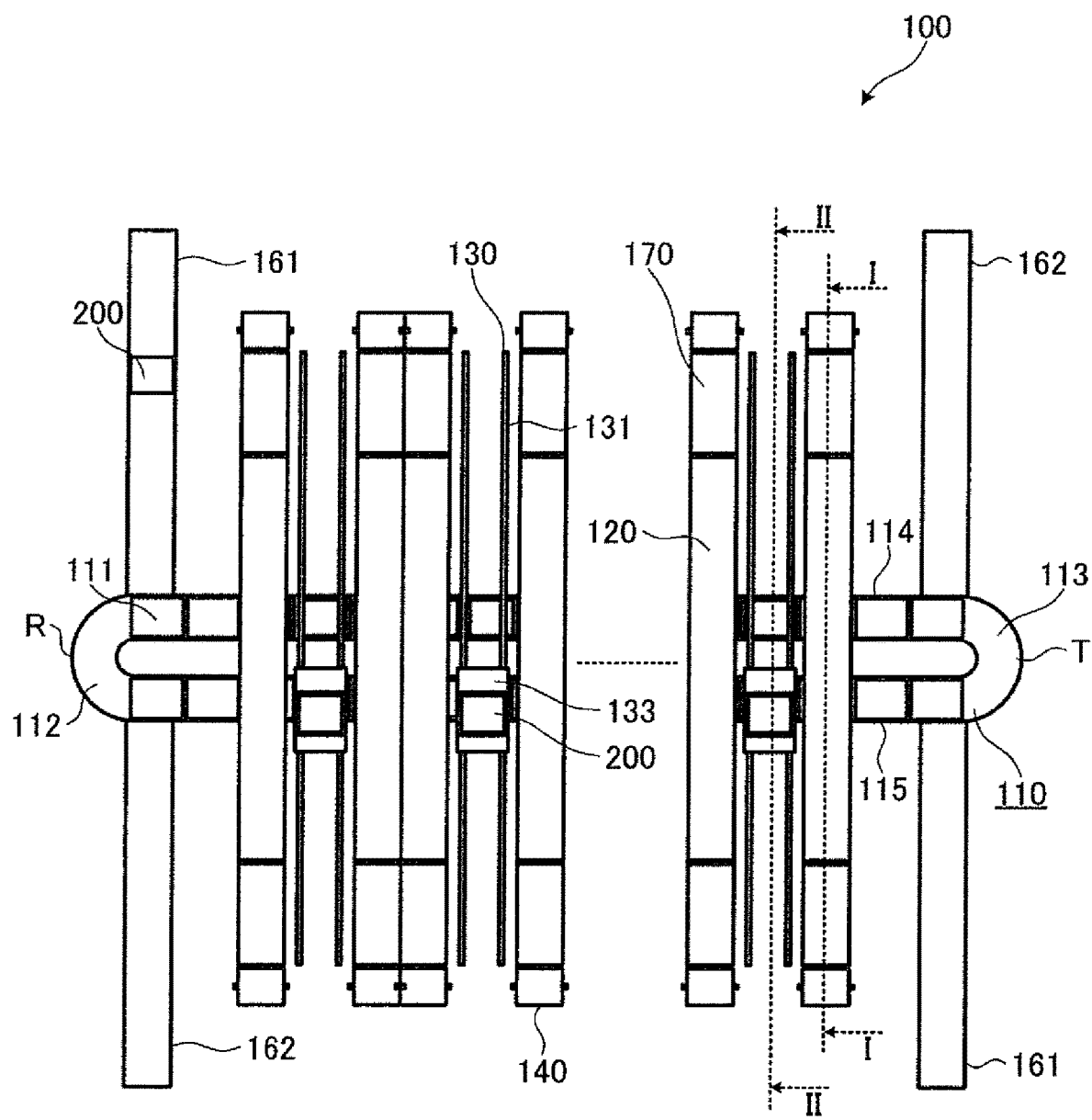
FIG. 2 is a plan view illustrating the automated warehouse system.
Figure 3:
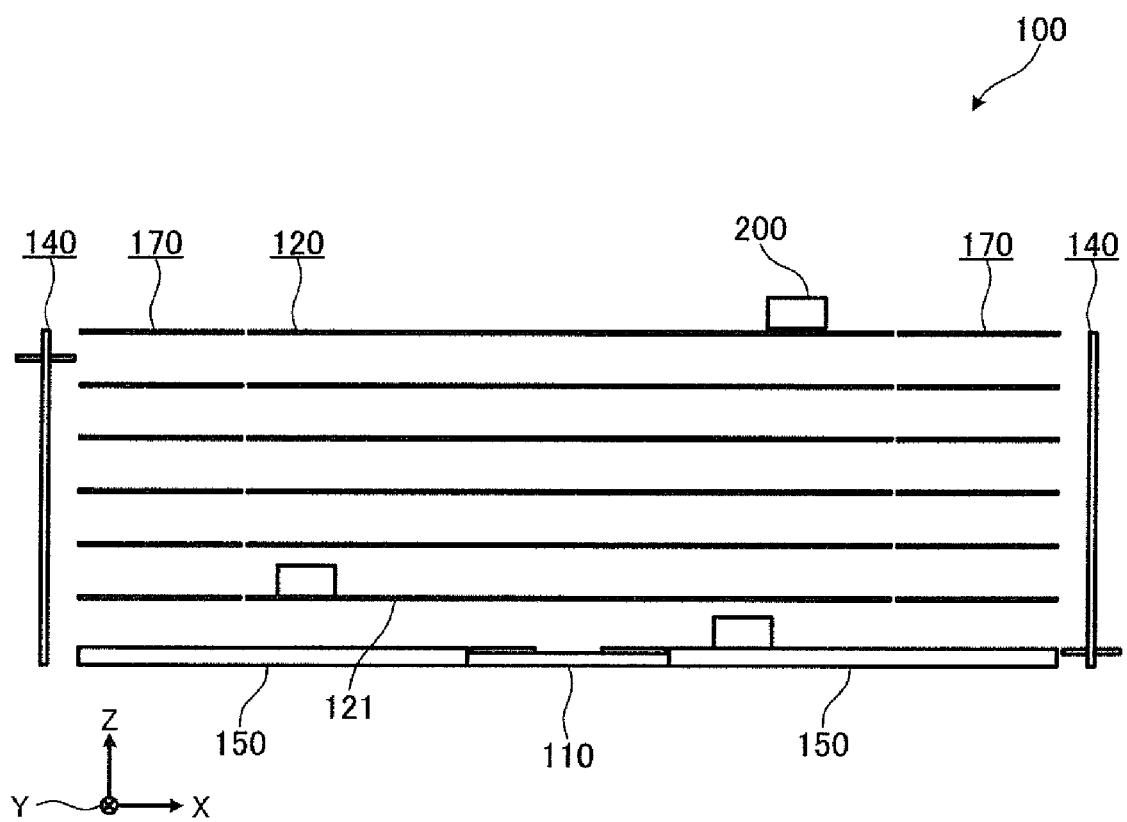
FIG. 3 is a side view illustrating a rack part (I-I line in FIG. 2) of the automated warehouse system.
Figure 4:
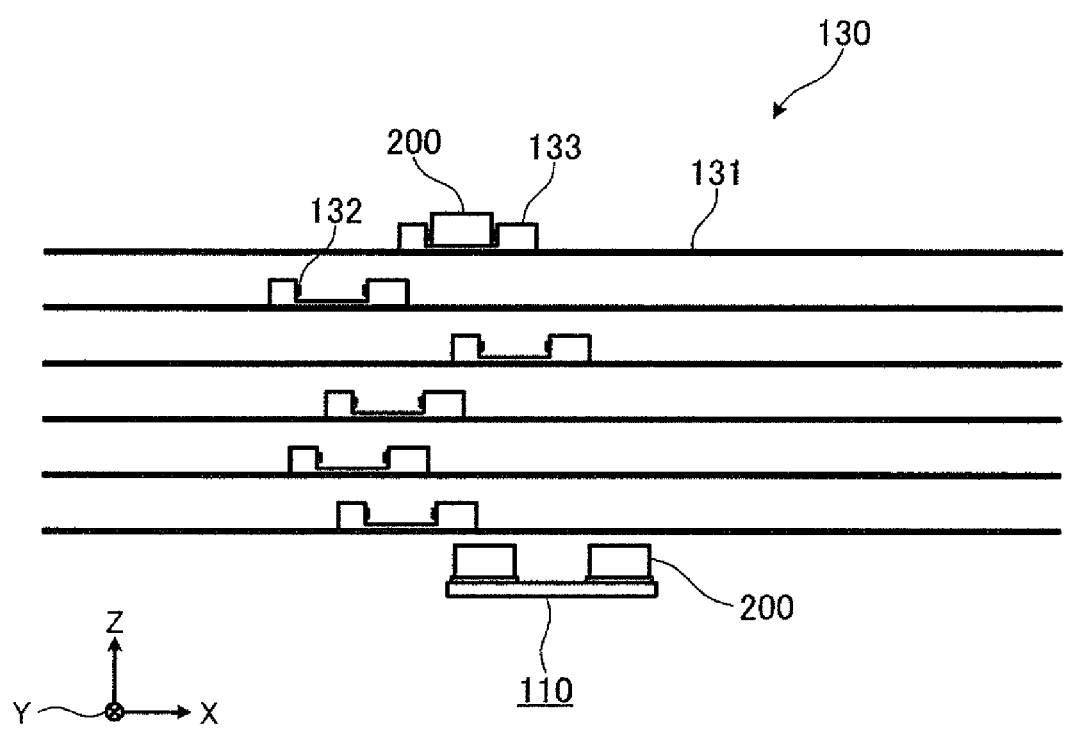
FIG. 4 is a side view illustrating a transport vehicle part (II-II line in FIG. 2) of the automated warehouse system.

FIG. 1 is a perspective view illustrating the automated warehouse system. FIG. 2 is a plan view illustrating the automated warehouse system. FIG. 3 is a side view illustrating a rack part of the automated warehouse system. FIG. 4 is a side view illustrating a transport vehicle part of the automated warehouse system. In the drawings, letters written on pillars and the like have been omitted. As illustrated in the drawings, an automated warehouse system 100 is capable of storing a large number of articles 200 with high density, retrieving an article 200 stored in a randomly chosen place, and storing an article 200 that have been received in a randomly chosen place, and includes a revolving transport device 110, a rack 120, a transport vehicle 130, a lift transport device 140, a transfer device 150, a loading device 161, and an unloading device 162. Further, according to the examples, the automated warehouse system 100 further includes a relay device 170 and a control device 180.

The revolving transport device 110 is a device that revolves a holding table 111 holding the article 200 to transport the article 200. The revolving transport device 110 is configured to revolve the holding table 111 holding the article 200 in one direction to transport the article 200 from a predetermined place to another place. Examples of the revolving transport device 110 include a device that causes the holding table 111 to continuously revolve, a device that causes each of a plurality of the holding tables 111 to intermittently travel and the like. The revolving transport device 110 is capable of loading and unloading the article 200 at a plurality of randomly chosen points on a travel path on which the holding table 111 travels. The travel path on which the holding table 111 travels may be disposed parallel to a floor surface (an XY plane in the drawings) on which the automated warehouse system 100 is installed, and may include a first curve 112 including a reference point R, a second curve 113 including a turning point T, and a forward path 114 and return path 115 that are straight paths and connect the first curve 112 and the second curve 113. Further, the revolving transport device 110 may be disposed close to the floor surface where the automated warehouse system 100 is installed. The forward path 114 and the return path 115 may be interchanged in accordance with a revolving direction of the holding table 111. Further, the travel path of the holding table 111 may have not only a rectangular shape with rounded corners as illustrated in FIGS. 1 and 2, but also any shape such as an oval shape or an egg shape.

The reference point R denotes a randomly determined virtual position on a revolving path of the revolving transport device 110, the reference point R serving as a starting point of the forward path 114 and an end point of the return path 115. The reference point R may be located at a center of the first curve 112 outside one of outermost racks 120 of the racks 120 arranged in parallel along a Y axis of the drawings. On the other hand, the turning point T may denote a randomly determined virtual position located on an opposite side of the revolving path of the revolving transport device 110 relative to the reference point R, the turning point T serving as an end point of the forward path 114 and a starting point of the return path 115. The turning point T may be located at a center of the second curve 113 outside the other outermost rack 120 of the racks 120 arranged in parallel along the Y axis of the drawings. In other words, the revolving transport device 110 may include a forward-path straight line, a return-path straight line, and the first curve 112 and the second curve 113 that connect the forward-path straight line and the return-path straight line.

The holding table 111 is a member that travels along the travel path while holding the article 200 to transport the article 200. The revolving transport device 110 may include a plurality of the holding tables 111 connected to one another or a plurality of the holding tables 111 capable of individually traveling. Alternatively, the revolving transport device 110 may include the holding table 111 disposed all over the travel path like a belt conveyor. The holding table 111 may include a second transferring and placing device that transfers and places an article with respect to another device. Alternatively, the automated warehouse system 100 may include the second transferring and placing device that does not travel together with the holding table 111 and is fixed to the revolving transport device 110.

The revolving transport device 110 may include a plurality of the holding tables 111 that individually travel along the travel path formed by traveling rails. A drive source that drives each of the holding tables 111 to travel may not be particularly limited, and a linear motor may be employed that produces a drive force in a travel direction using an external magnetic action with neither a battery nor an electric motor provided on the holding table 111. Specifically, the holding table 111 may include a travel mover having a permanent magnet, and travels along the travel path of the holding table 111 with a force in the travel direction produced by the travel mover using a magnetic action from a travel stator continuously or discretely disposed along the travel path of the holding table 111.

The travel stator is disposed all over a predetermined travel path. Specifically, the travel stator is constituted of a plurality of coils arranged side by side on a long plate member provided along the predetermined travel path. That is, substantially, the plurality of coils serve as the travel stator. The plurality of coils constituting the travel stator are individually controlled by a controller (not illustrated) to individually produce a magnetic field. As described above, the travel stator can be individually controlled by the controller to allow the plurality of holding tables 111 to travel on the traveling rails.

The second transferring and placing device may be provided on each holding table 111. The second transferring and placing device may transfer and place the article 200 with respect to the transfer device 150, the loading device 161, the unloading device 162 and the like that are each disposed to face the revolving transport device 110. A type of the second transferring and placing device is not particularly limited, and the second transferring and placing device may be a so-called conveyor capable of moving an article in a direction orthogonal to the travel direction of the holding table 111. The second transferring and placing device may include an endless annular member that moves the article 200 with the article 200 placed thereon, a pair of rollers that cause the endless annular member to revolve along a predetermined track, and a transmission member that transmits a drive force from a transferring and placing mover to one of the rollers. A transferring and placing stator used to drive the transferring and placing mover is disposed on the travel path at a position corresponding to the transfer device 150, the loading device 161, the unloading device 162 and the like.

Examples of the endless annular member include an annular rubber belt, plate members connected into a loop and the like. The endless annular member is a member stretched between the pair of rollers and is capable of revolving on the predetermined track in a forward direction or a reverse direction through rotation of the rollers.

The second transferring and placing device provided on the holding table 111 is not limited to the above configuration and may be any device such as a roller conveyor without the endless annular member.

As illustrated in FIG. 3, the rack 120 is equipment including a plurality of shelf boards 121 that store the article 200, the shelf boards 121 being arranged in a direction (an X-axis direction in the drawing) intersecting the forward path 114 and the return path 115 of the revolving transport device 110 in a horizontal plane (the XY plane in the drawing) and in a vertical direction (a Z-axis direction in the drawing). The rack 120 is disposed across at least one of the forward path 114 extending from the reference point R to the turning point T of the revolving transport device 110 and the return path 115 extending from the turning point T to the reference point R. The rack 120 may extend in the direction (the X-axis direction in the drawing) intersecting the forward path 114 and the return path 115 across both the forward path 114 and the return path 115 that are arranged in parallel along the Y axis in the drawing. Further, a plurality of the racks 120 may be arranged in parallel in a direction in which the forward path 114 and the return path 115 extend (the Y-axis direction in the drawing). Specifically, as illustrated in FIG. 3 in the vertical direction (the Z-axis direction in the drawing), the rack 120 is installed on the same floor level as the revolving transport device 110 is installed, but the rack 120 does not include a portion that stores the article 200 on the same floor level as the revolving transport device 110 is installed and includes the shelf boards 121 that store the article 200 upward from a level one step higher than the floor level. Further, in the horizontal plane (the XY plane in the drawing), each of the shelf boards 121 may extend above the forward path 114 and the return path 115 of the revolving transport device 110 like an overhead crossing with the revolving transport device 110.

The transport vehicle 130 is disposed adjacent to a side of the rack 120. The transport vehicle 130 is capable of transporting the article 200 across at least one of the forward path 114 and the return path 115 of the revolving transport device 110 and includes a transferring and placing device 132 capable of transferring and placing the article 200 with respect to both sides of the revolving transport device 110. Further, the transport vehicle 130 is further capable of transferring and placing the article 200 with respect to the shelf boards 121 of the rack 120 arranged immediately above the revolving transport device 110. The transport vehicle 130 may include rails 131 arranged at positions corresponding to a plurality of levels of the rack 120 and across the forward path 114 and the return path 115, and a plurality of vehicles 133 that each travel along a corresponding one of the rails 131 and transports the article 200. The vehicles 133 may each include the transferring and placing device 132 that transfers and places the article 200 with respect to the rack 120.

The transferring and placing device 132 is not particularly limited, and examples of the transferring and placing device 132 include a device that slides the article 200 between the transferring and placing device 132 and the rack 120 by pushing or pulling a side of the article 200, a device that lifts the article 200 with a fork to transfer and place the article 200 and the like.

The lift transport device 140 lifts the article 200 received from the transfer device 150 to a desired position corresponding to each level of the rack 120, and lowers the article 200 received from each level of the rack 120 to a position of the transfer device 150. A type of the lift transport device 140 is not particularly limited, and a so-called vertical conveyor capable of lifting and lowering one article 200 may be employed.

A position where the lift transport device 140 is disposed is not particularly limited, and the lift transport device 140 may be disposed at both ends of each of the plurality of racks 120. This results in a layout that prevents the lift transport device 140 from coming into contact with the transport vehicle 130, thereby allowing a relatively large lift transport device 140 with high transport efficiency to be employed.

The transfer device 150 transfers the article 200 received from the revolving transport device 110 to the lift transport device 140 and transfers the article 200 received from the lift transport device 140 to the revolving transport device 110. A position where the transfer device 150 is disposed is not particularly limited and the transfer device 150 may be disposed, as illustrated in FIG. 3, on the same floor level as the revolving transport device 110 is installed in the vertical direction (the Z-axis direction in the drawing). Further, in the horizontal plane (the XY plane in the drawing), the transfer device 150 may extend in the direction intersecting the forward path 114 and the return path 115 of the revolving transport device 110 and may be disposed with an end of the transfer device 150 in contact with the revolving transport device 110. Further, the transfer device 150 may be disposed to coincide with the rack 120 in top view (when viewed from a positive side to a negative side of the Z axis in the drawing). That is, the transfer device 150 is disposed immediately below the lowermost level of the rack 120.

A type of the transfer device 150 is not particularly limited, and examples of the transfer device 150 include a roller conveyor, a belt conveyor and the like. Further, a plurality of the transfer devices 150 connect to each of the forward path 114 and the return path 115 of the revolving transport device 110. Among the transfer devices 150, transfer devices 150 that each exclusively transfer the article 200 from the revolving transport device 110 to the lift transport device 140 and transfer devices 150 that each exclusively transfer the article 200 from the lift transport device 140 to the revolving transport device 110 may be predetermined. This allows a gravity conveyor or the like that transports the article 200 with the help of gravity to be employed as the transfer device 150.

The transfer device 150 may extend along and under the rack 120 by about a half of a length of the rack 120. This allows the transfer device 150 to have a large number of articles 200 placed thereon and thus allows the transfer device 150 to serve as a buffer for the articles 200. Keeping the articles 200 on the transfer device 150 makes it possible to absorb a difference in capability, for example, between the revolving transport device 110 and the lift transport device 140 and thus makes it possible to smoothly operate the whole of the automated warehouse system 100.

Figure 5:
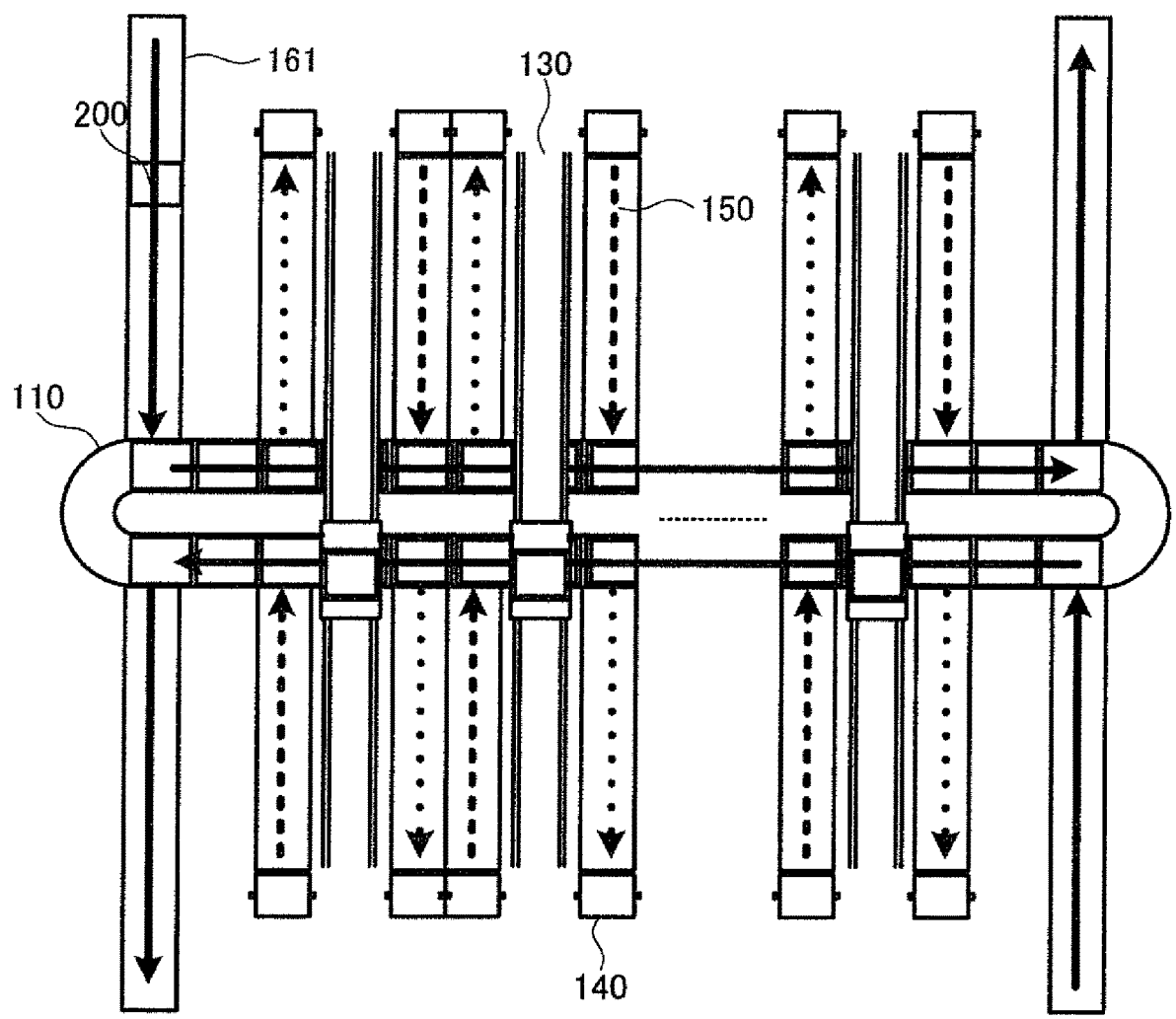
FIG. 5 is a diagram illustrating a flow of an article on a revolving transport device and a transfer device.

Further, as illustrated in FIG. 5, the transfer devices 150 may be arranged on both sides of the transport vehicle 130. The transfer devices 150 arranged on both sides of the transport vehicle 130 may be configured so that one of the transfer devices 150 transfers the article 200 from the revolving transport device 110 to the lift transport device 140 (dotted lines in FIG. 5), and the other transfer device 150 transfers the article 200 from the lift transport device 140 to the revolving transport device 110 (dashed lines in FIG. 5). Furthermore, the transfer devices 150 arranged to face each other with the revolving transport device 110 interposed therebetween may be configured to transfer the article 200 in the same direction. That is, transfer devices 150 arranged on a side of the revolving transport device 110 opposed to transfer devices 150 configured to unload the article 200 from the forward path 114 may be configured to load the article 200 to the return path 115. Further, transfer devices 150 arranged on a side of the revolving transport device 110 opposed to transfer devices 150 configured to load the article 200 to the forward path 114 may be configured to unload the article 200 from the return path 115.

The loading device 161 is a device that loads the article 200 to the revolving transport device 110 to put the article 200 into the automated warehouse system 100. The unloading device 162 is a device that unloads the article from the revolving transport device 110 to cause the automated warehouse system 100 to retrieve the article 200. Respective types of the loading device 161 and the unloading device 162 are not particularly limited, and a conveyor similar to the transfer device 150 may be employed. Specifically, for example, the loading device 161 is a device on which the article 200 transported by a truck or the like is placed by human power or the like. The loading device 161 may load the article 200 thus placed to the revolving transport device 110 to put the article 200 into the automated warehouse system 100. Further, the unloading device 162 may unload the article 200 received from the revolving transport device 110 to a truck station or the like. The article 200 may be taken by human power or the like out of the unloading device 162, and is then retrieved from the automated warehouse system 100.

Respective positions where the loading device 161 and the unloading device 162 are disposed are not particularly limited, and the loading device 161 and the unloading device 162 may each be disposed in the vertical direction (the Z axis direction in the drawing), on the same floor level as the revolving transport device 110 is installed. Further, in the horizontal plane (the XY plane in the drawing), the loading device 161 and the unloading device 162 each extend in the direction intersecting the forward path 114 and the return path 115 of the revolving transport device 110 and are disposed with their respective ends in contact with the revolving transport device 110. Further, in top view, the loading device 161 and the unloading device 162 are each disposed outside an area where the racks 120 are arranged.

The automated warehouse system 100 may include a plurality of (two according to the example) the loading devices 161 and a plurality of (two according to the example) the unloading devices 162. With this configuration, the loading devices 161 may be arranged at an upstream end (a reference point R side) of the forward path 114 and an upstream end (a turning point T side) of the return path 115 of the revolving transport device 110. The unloading devices 162 may be arranged at a downstream end (a turning point T side) of the forward path 114 and a downstream end (a reference point R side) of the return path 115 of the revolving transport device 110. With this configuration, all the articles 200 transported on the forward path 114 of the revolving transport device 110 are unloaded to the transfer device 150 and are finally retrieved by the unloading device 162 disposed at the downstream end of the forward path 114, thereby preventing the articles 200 from passing through the second curve 113. Similarly, all the articles 200 transported on the return path 115 of the revolving transport device 110 are unloaded to the transfer device 150 and are finally retrieved by the unloading device 162 disposed at the downstream end of the return path 115, thereby preventing the articles 200 from passing through the first curve 112. This allows the holding table 111 of the revolving transport device 110 to pass through the first curve 112 and the second curve 113 without holding the article 200 and thus allows the holding table 111 to pass through the curves at high speed.

Accordingly, it is possible to increase transport efficiency of revolving transport device 110. The upstream end corresponds to an upstream side in a transport direction of the revolving transport device 110 relative to the racks 120 and the transfer devices 150 arranged as described above. That is, the upstream end needs to be located at a straight portion other than a curved portion and need not be necessarily located at a physical end. Further, the downstream end corresponds to a downstream side in the transport direction of the revolving transport device 110 relative to the racks 120 and the transfer devices 150 arranged as described above and is similar to the upstream end.

The control device 180 is a computer that controls the automated warehouse system 100 and controls loading and unloading of the article 200 to and from the revolving transport device 110 to prevent the article 200 from passing through the first curve 112 including the reference point R and the second curve 113 including the turning point T. Specifically, the control device 180 performs control so that the article 200 loaded by the loading device 161 disposed at the upstream end of the straight portion of the forward path is unloaded to any one of the plurality of transfer devices 150 arranged along the straight portion of the forward path and all the articles 200 loaded by the plurality of transfer devices 150 arranged along the straight portion of the forward path are unloaded by the unloading device 162 disposed at the downstream end.

The relay device 170 is a device that takes the article 200 out of the lift transport device 140 and moves the article 200 to a position where the transport vehicle 130 can receive the article 200. The relay device 170 is a device that delivers the article 200 received from the transport vehicle 130 to the lift transport device 140. A type of the relay device 170 is not particularly limited, and a conveyor may be employed. The relay device 170 is disposed between an end of each shelf board 121 and the lift transport device 140 disposed outside an end of the rack 120 in the extending direction of the rack 120 (the X-axis direction in the drawing). Further, the relay device 170 is included in the rack 120. This configuration allows the relay device 170 to receive and move the article 200 lifted up to a desired level of the rack 120 by the lift transport device 140 to a predetermined position and thus allows the transport vehicle 130 to receive the article 200 without coming into contact with the lift transport device 140. Further, the relay device 170 is capable of delivering the article 200 transferred and placed by the transport vehicle 130 to the lift transport device 140.

The automated warehouse system 100 configured as described above is capable of storing a large number of articles 200 in the plurality of racks 120 at high density. The automated warehouse system 100 is further capable of causing the revolving transport device 110 disposed across the plurality of racks 120 to retrieve even the article 200 stored in any one of the racks 120 to a desired position with high efficiency.

As an example of a specific movement of the article 200, the following operation is performed. For the article 200 to be loaded to the automated warehouse system 100, a vacant shelf that is a place in the rack 120 where the article 200 is to be stored is selected either before or after the loading device 161 holds the article 200. The article 200 transferred and placed from the loading device 161 onto the revolving transport device 110 is transferred and placed onto a transfer device 150 disposed on a receiving side, that is, a transfer device 150 disposed along the forward path 114 when the article 200 has been loaded to the forward path 114, or a transfer device 150 disposed along the return path 115 when the article 200 has been loaded to the return path 115. The article 200 transferred to the lift transport device 140 by the transfer device 150 is lifted by the lift transport device 140 to a shelf board 121 of a predetermined height and transferred to the relay device 170. The transport vehicle 130 receives the article 200 from the relay device 170 and transports the article 200 to the predetermined vacant shelf, and then transfers and places the article 200 onto the vacant shelf. Even when no vacant shelf is present on the receiving side, the transport vehicle 130 transports the article 200 to a position across the revolving transport device 110. Such transportation of the article 200 allows the article 200 to be stored in the rack 120 without passing through the curve of the revolving transport device 110. When the article 200 may pass through the curve, the article 200 may be transferred and placed onto a transfer device 150 on a side different from the receiving side such as a side closer to the vacant shelf or a side where a smaller number of articles 200 are kept.

On the other hand, when a retrieval instruction is issued from the automated warehouse system 100, for example, an instruction for retrieval from the unloading device 162 on any one of the sides of the revolving transport device 110 is issued, the transport vehicle 130 onto which the article 200 has been transferred and placed from the rack 120 transports the article 200 to the relay device 170 on a side where the unloading device 162 corresponding to the retrieval instruction is disposed. In this example, the article 200 may be transported to a position across the revolving transport device 110. The lift transport device 140 that has received the article 200 from the relay device 170 lowers the article 200 to the transfer device 150, and the transfer device 150 transfers the article 200 to the revolving transport device 110. The revolving transport device 110 transports the article 200 to the unloading device 162, and the unloading device 162 unloads the article 200. Such transportation of the article 200 allows the article 200 to be unloaded from the rack 120 without passing through the curve of the revolving transport device 110. When the article 200 may pass through the curve, the article 200 may be transported by the transport vehicle 130 to the relay device 170 on a side different from on the side where the unloading device 162 corresponding to the retrieval instruction is disposed such as a side closer to the shelf on which the article 200 is stored or a side where a smaller number of articles 200 are kept.

This disclosure is not limited to the above example. For example, another example/configuration implemented with any combination of the constituent elements described herein or with constituent elements that result from excluding some constituent elements from the constituent elements described herein may be employed as the example. Further, alternative examples obtained by applying, to the above-described example, various modifications possible by those skilled in the art without departing from the spirit of the disclosure, that is, the meaning represented by the description in the appended claims, are also within the scope of this disclosure.

Figure 6:
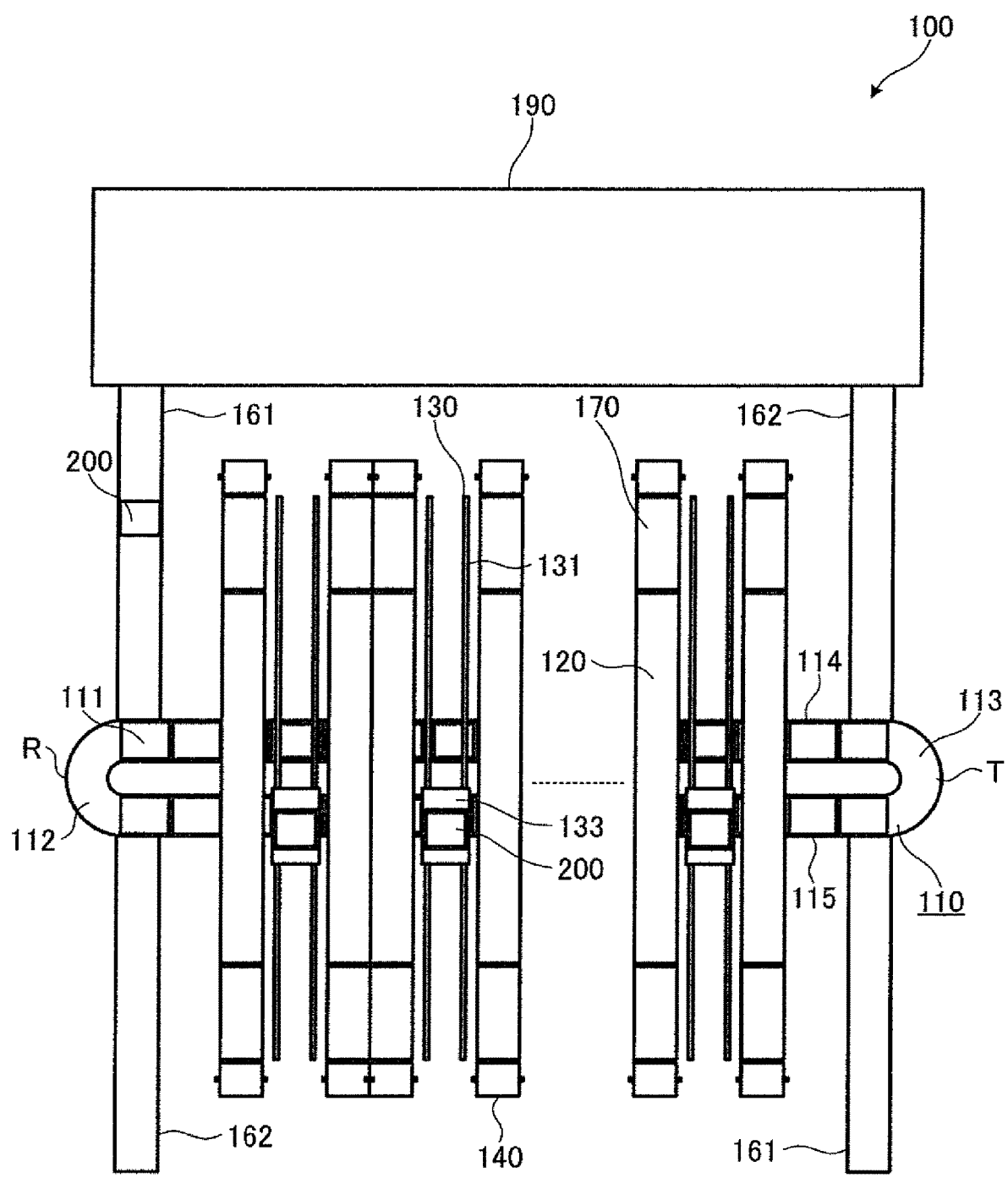
FIG. 6 is a plan view illustrating another example of the automated warehouse system.

For example, as illustrated in FIG. 6, the automated warehouse system 100 may include a storage 190 that stores the article 200 to be supplied to the loading device 161 and stores the article 200 unloaded from the unloading device 162. With this configuration, the storage 190 includes a transport transferring and placing device (not illustrated) such as a stacker crane that is lower in efficiency than the transport vehicle 130, and stores articles 200 not put and retrieved as frequently as articles 200 to be stored in the rack 120. As described above, the configuration where the transport transferring and placing device having a relatively low transport efficiency and the storage 190 that requires much time for putting and retrieving but has a large storage capacity are employed allows a large number of articles 200 to be handled while allowing the loading device 161 and the unloading device 162 to promptly load and unload the articles 200 due to a preparation operation of the storage 190 for the putting and retrieving of the articles 200.

Further, although a description has been given of a device in which each vehicle 133 travels on a corresponding one of the levels of the rack 120 as the transport vehicle 130, the transport vehicle 130 is not limited to this configuration. For example, each vehicle 133 may include a lifter capable of lifting and lowering the transferring and placing device 132 to a height corresponding to one of the plurality of levels of the rack 120. For example, when the lifter is capable of lifting the transferring and placing device 132 by three levels, the vehicles 133 are arranged on every three levels of the rack 120.

Further, any storage mechanism including not only a storage mechanism that places the article 200 on the shelf board 121, but also a storage mechanism that places the article 200 on a cantilever, and a storage mechanism that hangs the article 200 on a lever is applicable to the rack 120.

Further, when the article 200 can be directly transferred and placed between the lift transport device 140 and the transport vehicle 130, the automated warehouse system 100 need not include the relay device 170.

My systems are applicable to a picking system that stores a large number of articles and delivers required articles to a predetermined position, a machine production factory and the like.

What is claimed is:

1. An automated warehouse system configured to automatically put and retrieve an article, the automated warehouse system comprising:
    a revolving transport device configured to revolve a holding table holding the article to transport the article along a travel path having at least one of a forward path and a return path, the forward path extending from a reference point to a turning point of the revolving transport device, the return path extending from the turning point to the reference point;
    a plurality of racks arranged across the forward path and the return path;
    a transport vehicle disposed adjacent to a side of each of the racks and configured to transport the article along the rack, the transport vehicle including a transferring and placing device configured to transfer and place the article with respect to the rack;
    a lift transport device disposed at both sides of each of the plurality of racks and configured to lift and lower the article to a position corresponding to each level of each of the racks;
    a plurality of transfer devices connected to each of the forward path and the return path and configured to transfer the article between the revolving transport device and the lift transport device;
    a loading device configured to load the article to the revolving transport device; and an unloading device configured to unload the article from the revolving transport device.

2. The automated warehouse system according to claim 1, wherein the loading device is disposed at both an upstream end of the forward path and an upstream end of the return path of the revolving transport device, and the unloading device is disposed at both a downstream end of the forward path and a downstream end of the return path of the revolving transport device.

3. The automated warehouse system according to claim 2, further comprising a control device configured to control loading and unloading of the article to and from the revolving transport device to prevent the article from passing through the reference point and the turning point.

4. The automated warehouse system according to claim 1, wherein the lift transport device is disposed at an end of each of the racks.

5. The automated warehouse system according to claim 1, further comprising:

a storage configured to store the article to be supplied to the loading device and the article unloaded from the unloading device; and a further transferring and placing device that transfers and places the article with respect to the storage and is lower in transport efficiency than the transport vehicle.

* * * * *